United States Patent Office 3,575,689
Patented Apr. 20, 1971

3,575,689
METHOD FOR MAKING FERROMAGNETIC CHROMIUM DIOXIDE

Toshihiro Mihara, Yukio Terada, and Eiichi Hirota, Osaka, Japan, assignors to Matsushita Electric Industrial Co., Ltd., Kadoma, Osaka, Japan No Drawing. Filed July 31, 1968, Ser. No. 748,935
Claims priority, application Japan, Aug. 10, 1967, 42/51,674
Int. Cl. C01g *37/02;* H01f *1/00*
U.S. Cl. 23—145 5 Claims

ABSTRACT OF THE DISCLOSURE

Ferromagnetic chromium dioxide is prepared by mixing chromium trioxide and $NH_4^+$ ions (i.e. aqueous solution of an ammonium compound or such compound per se), heating the mixture at 280–480° C. in an autoclave, furnace-cooling the mixture, washing and drying. The weight ratio $NH_4^+:CrO_3$ is from 0.01:1.0 to 0.08:1.0. Advantageously, 0.01 to 20.0 atomic percent of tellurium is incorporated into the mixture to be heated. The obtained ferromagnetic chromium dioxide has high coercive force and high saturation magnetization so that it is useful e.g. in magnetic recording tape, etc.

This invention relates to a method for making ferromagnetic chromium dioxide having a high magnetic coercive force and a high saturation magnetization.

Since the Russian publication by S. M. Ariya et al. (Zhur. Obshei. Khim. Soviet 23, p. 1241, 1953) has disclosed that ferromagnetic chromium dioxide in a single phase of rutile-type structure can be obtained by the thermal decomposition of anhydrous chromium trioxide at a temperature of 420° C. to 450° C. under an oxygen pressure of 200 to 300 atmospheres, much attention has been paid to ferromagnetic chromium dioxide in a single phase for use in magnetic recording members. Various modified chromium dioxides have been described in the prior literature; see, for example, U.S. Pats. Nos. 2,885,365; 2,923,683; 2,923,684; 2,923,685 and 3,243,260. Recent magnetic recording tape requires ferromagnetic materials having a high magnetic coercive force, a high saturation magnetization and a uniform particle size distribution for achieving a high resolution recording. From the standpoint of manufacture, it is desirable to make the objective ferromagnetic oxide by using a heating temperature and a reaction pressure as low as possible.

An object of the present invention is to provide a method for making ferromagnetic chromium dioxide characterized by a higher coercive force and a higher saturation magnetization.

Another object of the invention is to provide a method for making ferromagnetic chromium dioxide characterized by a more uniform particle size distribution.

These and other objects of the invention will be apparent upon consideration of the following detailed description.

A method for making ferromagnetic chromium dioxide in a finely divided powder form according to the present invention comprises admixing chromium trioxide with an aqueous solution containing $NH_4^{1+}$ ions or with a compound including $NH_4^{1+}$ ions (hereinafter referred to as $NH_4^+$ ions) and heating the mixture at a temperature of 280° C. to 480° C. under a high pressure. It has been discovered according to the invention that chromium trioxide, as a starting material, admixed with an aqueous solution containing $NH_4^+$ ions or with a compound including $NH_4^+$ ions produces ferromagnetic chromium dioxide having a higher coercive force and a higher magnetization than can be produced by chromium trioxide without said aqueous solution or said compound. Such a novel effect of said aqueous solution or said compound is more effectively achieved when the chromium trioxide as a starting material has 0.01 to 20.0 atomic percent of tellurium incorporated therewith. The sum of the atomic percent of tellurium and the atomic percent of chromium should be 100 atomic percent.

Advantageously, the atomic percent of tellurium ranges from 0.01 to 5.0 atomic percent. Chromium trioxide having 0.01 to 5.0 atomic percent tellurium incorporated therewith produces ferromagnetic chromium dioxide in a single phase of rutile type tetragonal crystal structure when heated together with said aqueous solution or compound at a temperature of 280° C. to 480° C. under high pressure. Said single phase is confirmed by a D3–F type X-ray diffractometer (Rigakudenki Co.) using copper $K\alpha$ radiation at 35 kv. and 15 ma. Chromium dioxide in a single phase has a high coercive force and a high saturation magnetization.

The coercive force ($H_c$), residual magnetization ($B_r$) and maximum magnetization ($4\pi I_m$) are derived from I–H hysteresis loop of the ferromagnetic material measured at maximum field of 2000 oersteds and at room temperature. The chromium trioxide having tellurium incorporated therewith can be prepared by mixing chromium trioxide with metallic tellurium or any available tellurium compound in an amount to produce a desired atomic percent of tellurium. Advantageously, the tellurium compound is a compound with hexavalent tellurium, e.g. $H_2TeO_4$, $H_6TeO_6$ or $TeO_3$.

It is necessary that the weight ratio of $NH_4^+$ ions in said aqueous solution or compound to the starting pure chromium trioxide or chromium trioxide having 0.01 to 20.0 atomic percent of tellurium incorporated therewith ranges from 0.001:1.0 to 0.15:1.0. The best results can be obtained with said weight ratio ranging from 0.01:1.0 to 0.08:1.0 in accordance with the invention. Such a weight ratio can be achieved by a combination of a concentration and an added amount of said aqueous solution. The higher concentration requires the smaller amount of added aqueous solution and vice versa.

Any aqueous solution containing $NH_4^+$ ions is operable; for example, aqueous solution of $NH_3$, $NH_4Cl$, $NH_4F$, $NH_4Br$ or $(NH_4)_2CrO_4$, $(NH_4)_2Cr_2O_7$ is suitable. Said starting chromium trioxide can be admixed with at least one compound containing $NH_4^+$ ions in an amount to produce said weight ratio of $NH_4^+$ ions to chromium trioxide.

Chromium trioxide with or without addition of aforesaid tellurium compound is admixed with an aqueous solution of suitable concentration of $NH_4^+$ ions by a conventional mixing technique. The mixture is placed in an autoclave which is made of a corrosion-resistant metal such as stainless steel and which is provided with a thermocouple for measuring the reaction temperature and with a pressure gauge. Care should be taken that the amount of the mixture placed in the autoclave is controlled with respect to the inner volume of the autoclave so that the pressure in the autoclave due to the oxygen liberated from chromium trioxide, water vapor and $NH_3$ gas is in the range of 50 to 1,000 atmospheres at the objective reaction.

The autoclave having the mixture therein can be heated by any suitable method such as by an electric furnace while the temperature of the mixture is being measured. After reaching the reaction temperature, the mixture is maintained at the temperature for a suitable time period which depends upon the pressure and the reaction temperature and is cooled to room temperature (about 15° to about 35° C.) in the autoclave. After having cooled, the mixture is removed from the autoclave, washed with water and dried by any suitable method.

Presently preferred exemplary embodiments follow.

EXAMPLE 1

A mixture of 20 grams of chromium trioxide, and 2.5 milliliters of water and 0.25 milliliter of ammonia water having 28% of $NH_3$ by weight is placed in a stainless steel autoclave equipped with a thermocouple and with a pressure gauge. The inner volume of the autoclave is 40 milliliters. The autoclave having the mixture therein is charged with oxygen from a gas cylinder up to 20 kg./cm.$^2$ and is heated by an electric heater wound around the autoclave. The mixture in the autoclave is heated at 380° C. for 2 hours under a pressure of 230 kg./cm.$^2$ and cooled to room temperature. The cooled product is washed with water and dried.

The X-ray diffraction analysis described in the foregoing description proves all resultant products to be chrominum dioxide in a single phase of rutile type tetragonal crystal structure. An electron microscopic observation also proves said products to be of a finely divided powder form. The magnetic properties and average particle size are listed in Table 1.

TABLE 1

| Sample | Hc, oersteds | 4πIm, gauss | Br, gauss | Average particle size, (μ) Length | Width |
|---|---|---|---|---|---|
| With ammonia water | 124 | 4,500 | 1,700 | 2.0~3.0 | 0.5~1.0 |
| Without ammonia water | 70 | 4,500 | 600 | 3.0~5.0 | 1.0~2.0 |

On the other hand, a mixture of 20 grams of chromium trioxide and 2.5 milliliters of water is subjected to the same procedure as that described above. The resultant product is chromium dioxide in a single phase of rutile type crystal structure and has the magnetic properties and average particle size listed in Table 1.

It will be clear from Table 1 that an addition of ammonia water improves the magnetic properties of resultant chromium dioxide.

EXAMPLE 2

A mixture of 20 grams of chromium trioxide, 0.230 gram of $H_6TeO_6$ and 4 milliliters of water is further admixed with ammonia water containing various amounts of ammonium ions as shown in Table 2. The mixture is placed in a stainless steel autoclave equipped with a thermocouple and with a pressure gauge. The inner volume of the autoclave is 40 milliliters. The autoclave having the mixture therein is heated by an electric heater wound around the autoclave. This mixture in the autoclave is heated at 400° C. under a pressure of about 350 atmospheres for 2 hours and cooled to room temperature.

The resultant product is of a finely divided powder form and is washed with water. An X-ray diffraction analysis as described in the foregoing description proves all resultant products to be chromium dioxide in a single phase of rutile type tetragonal crystal structure.

It will be clear from Table 2 that the coercive force increases with an increase in the amount of ammonium ions. The residual magnetization is maximum at about 2.80% in weight relative to chromium trioxide and the maximum magnetization decreases with an increase in the amount of the ammonium ions. In view of the combination of coercive force, residual magnetization and maximum magnetization, the addition of 1.40% to 4.20% of the ammonium ions to the mixture results in an optimum result.

TABLE 2

| Sample | Ammonium ion [1] | Hc, oersteds | Br, gauss | 4 π gauss |
|---|---|---|---|---|
| Number: | | | | |
| 1 | 0 | 216 | 1,400 | 3,800 |
| 2 | 0.70 | 240 | 1,680 | 4,000 |
| 3 | 1.40 | 260 | 1,720 | 3,800 |
| 4 | 2.80 | 367 | 2,000 | 3,700 |
| 5 | 4.20 | 430 | 1,680 | 3,200 |
| 6 | 8.40 | 512 | 1,200 | 3,000 |
| 7 | 12.60 | 518 | 1,200 | 3,000 |

[1] $NH_4^{1+}$, weight percent relative to $CrO_3$.

What is claimed is:

1. A method for making a ferromagnetic chromium dioxide in a finely divided powder form comprising admixing chromium trioxide with an aqueous solution containing $NH_4^+$ ions in which the weight ratio of $NH_4^+$ to chromium trioxide is between 0.001:1.0 and 0.15:1.0 and heating the mixture at a temperature of 280° C. to 480° C. in an autoclave under a pressure in the range of 50 to 1000 atmospheres due to ammonia gas, water vapor and oxygen.

2. A method according to claim 1 wherein the source of $NH_4^+$ ions is selected from the group consisting of $NH_3$, $NH_4Cl$, $NH_4F$, $NH_4Br$, $(NH_4)_2Cr_2O_7$.

3. A method for making ferromagnetic chromium dioxide in a finely divided powder form, according to claim 2 wherein said weight ratio of $NH_4^+$ ions to chromium trioxide ranges from 0.01 to 1.0 to 0.08 to 1.0.

4. A method for making ferromagnetic chromium dioxide in a finely divided powder form, according to claim 3 wherein said chromium trioxide is incorporated with 0.01 to 20.0 atomic percent of tellurium.

5. A method for making ferromagnetic chromium dioxide in a finely divided powder form, according to claim 4 wherein said chromium trioxide is incorporated with 0.01 to 5.0 atomic percent of tellurium.

References Cited

UNITED STATES PATENTS 2,956,955 10/1960 Arthur, Jr. ---------- 23—145
3,243,260 3/1966 Kubota et al. -------- 23—145

OSCAR R. VERTIZ, Primary Examiner

H. S. MILLER, Assistant Examiner

U.S. Cl. X.R.

252—62.51